(12) United States Patent
Delgrange et al.

(10) Patent No.: US 10,849,196 B2
(45) Date of Patent: Nov. 24, 2020

(54) DEVICE FOR DRIVING THE ELECTRICAL POWER SUPPLY OF LIGHT SOURCES OF AN AUTOMOTIVE VEHICLE ACCORDING TO VARIATIONS IN THEIR TEMPERATURES

(71) Applicant: VALEO VISION BELGIQUE, Meslin l'Eveque (BE)

(72) Inventors: Frederick Delgrange, Meslin l'Eveque (BE); Yves Dubois, Meslin l'Eveque (BE); Nicolas Durand, Meslin l'Eveque (BE)

(73) Assignee: VALEO VISION BELGIQUE, Meslin l'Eveque (BE)

( * ) Notice: Subject to any disclaimer, the term of this patent is extended or adjusted under 35 U.S.C. 154(b) by 0 days.

(21) Appl. No.: 16/448,152

(22) Filed: Jun. 21, 2019

(65) Prior Publication Data
US 2019/0394850 A1 Dec. 26, 2019

(30) Foreign Application Priority Data
Jun. 22, 2018 (FR) ...................................... 18 55614

(51) Int. Cl.
*H05B 45/10* (2020.01)
*H05B 45/395* (2020.01)
(Continued)

(52) U.S. Cl.
CPC ........... *H05B 45/10* (2020.01); *H05B 45/395* (2020.01); *B60Q 1/04* (2013.01)

(58) Field of Classification Search
CPC ........ H05B 45/00; H05B 45/10; H05B 45/37; H05B 45/48; H05B 45/50; H05B 47/105;
(Continued)

(56) References Cited

U.S. PATENT DOCUMENTS

2006/0238130 A1* 10/2006 Hosoya .............. H04N 5/23241
315/86
2010/0060175 A1* 3/2010 Lethellier .............. H05B 45/48
315/164
(Continued)

FOREIGN PATENT DOCUMENTS

EP 2 355 621 A2 8/2010

OTHER PUBLICATIONS

French Preliminary Search Report dated Feb. 6, 2019 in French Application 18 55614, filed on Jun. 22, 2018 (with English Translation of Categories of Cited Documents).

*Primary Examiner* — Wei (Victor) Y Chan
(74) *Attorney, Agent, or Firm* — Oblon, McClelland, Maier & Neustadt, L.L.P.

(57) ABSTRACT

A device for driving the electrical power supply of at least one light source of an automotive vehicle includes a power supply unit arranged to deliver an electric current to the light source, the intensity of the electric current being dependent on a reference voltage. The device is noteworthy in that a control unit is arranged to deliver, on the basis of an input voltage, various reference voltage levels to the power supply unit, according to the situation of an indication of the temperature of the light source with respect to at least a first threshold value and a second threshold value, which is higher than the first threshold value, with a view to observing the optical regulations.

20 Claims, 2 Drawing Sheets

(51) Int. Cl.
*B60Q 1/04* (2006.01)
*H05B 45/00* (2020.01)
*H05B 45/37* (2020.01)
*H05B 45/48* (2020.01)

(58) Field of Classification Search
CPC ..... G09G 2320/041; G09G 2320/0633; G09G 2320/064; G09G 2320/0646; G09G 2360/16; G09G 3/3413; G09G 3/3426; H04N 1/40056; H04N 2201/0458
See application file for complete search history.

(56) References Cited

U.S. PATENT DOCUMENTS

| | | | |
|---|---|---|---|
| 2011/0279058 A1* | 11/2011 | Dari | H05B 45/14 |
| | | | 315/294 |
| 2014/0176111 A1* | 6/2014 | Kim | H05B 45/10 |
| | | | 323/311 |
| 2014/0361693 A1* | 12/2014 | Angelin | H05B 45/10 |
| | | | 315/152 |
| 2016/0227616 A1* | 8/2016 | Lee | H05B 45/37 |
| 2016/0242254 A1 | 8/2016 | Baccarin et al. | |

* cited by examiner

DEVICE FOR DRIVING THE ELECTRICAL POWER SUPPLY OF LIGHT SOURCES OF AN AUTOMOTIVE VEHICLE ACCORDING TO VARIATIONS IN THEIR TEMPERATURES

The invention pertains to the field of the electrical power supply of light sources for automotive vehicles. More specifically, the invention relates to supplying light-emitting diode (LED) light sources with power.

A light-emitting diode (LED) is an electronic component capable of emitting light when an electric current flows therethrough. In the automotive field, LED technology is increasingly being used for numerous light signalling solutions. LEDs are used to provide lighting functions such as daytime running lights, signalling lights, etc. The luminous intensity emitted by an LED is generally dependent on the intensity of the electric current flowing therethrough. Inter alia, an LED is characterized by an electric current intensity threshold value. This maximum forward current generally decreases with increasing temperature. In order to protect the LED from damage, it is known practice to decrease the intensity of the electric current flowing through the LED when the junction temperature approaches the allowed maximum. Since the operating temperature varies over the use of an LED source, for example within a signalling light of an automotive vehicle, with constant electric current, the luminous intensity emitted by the LED is not constant. Moreover, for a light-emitting diode using AlInGaP semiconductors, with constant electric current, drops in luminous intensity of the emitted luminous flux reaching up to 70% are observed over a temperature range from −40° C. to 100° C. For other types of light-emitting diodes, for example InGaN light-emitting diodes, the same effect is present, although on a smaller scale.

The regulations that are currently in force require that at an ambient temperature of 25° C., the intensity of the luminous flux emitted by an automotive vehicle headlight, for example a rear fog light, always lies between a minimum value and a maximum value. However, the junction temperature of a light source, and hence its luminous intensity emitted with constant electric current, varies substantially between the time when the source is turned on and for example a time following its continuous operation for 30 minutes. If the intensity of the electric current supplying the light source with power is such that the intensity of the emitted luminous flux is in accordance with the regulations after 30 minutes of operation, the maximum allowed value is generally exceeded with the same electric current intensity when cold. In order to overcome this problem, the use of heat dissipation elements has been proposed. However, this solution is bulky and costly in the already very restricted space available for the design of an automotive vehicle headlight.

It is known practice in the art to use a driver circuit for driving the electrical power supply of an assembly or group of LEDs. The circuit defines the electric current applied to a branch that is connected as a load and which comprises the group of LEDs that are connected in series, or in a matrix array. In order to provide a constant supply of power, known driver circuits use various types of converters, including DC-to-DC, linear and resistive converters, to convert the direct electric current delivered for example by a car battery into a direct load current, capable of supplying the LEDs in question with power. These known circuits do not take the temperature of the light sources into account, and it is therefore difficult to guarantee a luminous flux which observes intensity restrictions predetermined by the regulations if the temperature of the light sources varies.

An object of the invention is to overcome at least one of the problems posed by the prior art. More specifically, an object of the invention is to propose a device for driving the electrical power supply of light sources which takes into account the variations in the intensity of the luminous flux emitted by the sources, according to the variations in the temperature thereof.

According to a first aspect of the invention, a device for driving the electrical power supply of at least one light source of an automotive vehicle is proposed. The device comprises a power supply unit arranged to deliver an electric current to said light source. The intensity of the electric current is dependent on a reference voltage. The device is noteworthy in that it comprises a control unit arranged to deliver, on the basis of an input voltage, various reference voltage levels to said power supply unit, according to the situation of an indication of the temperature of said light source with respect to at least a first threshold value and a second threshold value, which is higher than the first threshold value.

Preferably, the control unit may be arranged to deliver
a first reference voltage level, if the indication of the temperature of the light source is lower than the first temperature threshold value, T1,
a second reference voltage level, higher than the first reference voltage level, if the indication of the temperature of the light source lies between the first temperature threshold value, T1, and the second temperature threshold value, T2,
a third reference voltage level, if the indication of the temperature of the light source is higher than the second temperature threshold value, T2.

The control unit may preferably be arranged to increase/decrease the reference voltage level monotonically between the first, second and third reference voltage levels, according to the variation in the indication of the temperature of the light source over a range of values that is substantially centred around the first and second threshold values T1 and T2.

The control unit may preferably comprise an assembly of at least two branches in which each branch comprises a switch element and a thermistor that is arranged such that the off state of the switch element is dependent on the temperature of the thermistor, and wherein the assembly is arranged to deliver said second reference voltage level if no electric current is flowing through said branches.

The switch element of each branch may preferably comprise a bipolar transistor. This may preferably be an NPN or PNP bipolar transistor. The thermistor element of each branch may preferably comprise a positive-temperature-coefficient (PTC) resistor or a negative-temperature-coefficient (NTC) resistor.

Preferably, each branch may comprise at least one resistor. Each branch may preferably comprise a network of resistors.

The features of the electronic components of a branch may preferably define one of the threshold values, as well as a negative voltage bias with respect to the first reference voltage level.

Preferably, the control unit may be arranged such that the reference voltage level delivered to the power supply unit if the indication of the temperature is lower than the first threshold value is substantially equal to the reference voltage level delivered if the indication of the temperature is higher than the second threshold value.

The power supply unit may preferably comprise a linear converter circuit. Alternatively, it may comprise a DC-to-DC converter.

According to another aspect of the invention, a lighting module for a motor vehicle is proposed. The module comprises at least one light source and a device for driving the electrical power supply of said light source. The module is noteworthy in that the driver device is in accordance with one aspect of the present invention.

Preferably, said light source may comprise a light-emitting semiconductor element source. It may preferably be a light-emitting diode (LED) or an organic light-emitting diode.

Preferably, the light source may comprise a pixelated light-emitting semiconductor element. The pixelated element may preferably comprise a common substrate on which the elementary light-emitting semiconductor elements are arranged in a matrix array.

By using the measures proposed by the present invention, it becomes possible to provide a device for driving the electrical power supply of light sources, in particular light-emitting diode (LED) light sources, which allows an electric current with an intensity that varies with the temperature of the LEDs to be delivered. It therefore becomes possible to drive the sources such that they emit a luminous flux with an intensity that lies between predetermined limits, and do so independently of their junction temperature, without having to use thermal dissipation elements provided for this purpose. When the temperature of the light sources varies, the intensity of the electric current is automatically adjusted to compensate for the variation in the intensity of the luminous flux which results from the variation in temperature. According to preferred embodiments of the invention, an analogue control circuit involving only simple electronic components is used together with a linear conversion unit, known per se, in order to achieve the new functionality. This is therefore inexpensive to produce and occupies only a small volume of space. Sizing the electronic components used, i.e. the type of thermistor and the impedance of the resistors used, makes it possible to target predetermined temperature and electric-current-intensity ranges that are suitable for various light sources.

Other features and advantages of the present invention will be better understood with the aid of the description of the examples and of the drawings, in which.

Figure 1:
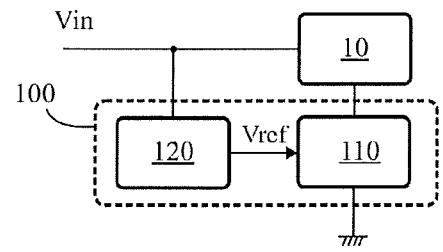
FIG. 1 shows a diagram corresponding to one preferred embodiment of a device according to the invention.

Unless specified otherwise, technical features that are described in detail for one given embodiment may be combined with the technical features that are described in the context of other embodiments described by way of example and nonlimitingly. Similar reference numerals will be used to describe similar concepts across various embodiments of the invention. For example, the references 100 and 200 denote two embodiments of a power supply device according to the invention.

Those components which are implicit and known per se will not be described in detail or mentioned if not required for the understanding of the described embodiments. For example, it is known that a lighting module comprises optical elements and various connection harnesses or carriers, despite these not being explicitly specified.

The illustration of FIG. 1 shows a device 100 for driving the electrical power supply of at least one light source 10 of an automotive vehicle. The light source is for example a light-emitting diode (LED). It may be a pixelated or matrix-array source, grouping a substantial number of light-emitting semiconductor elements together on one and the same substrate. The device 100 comprises, on the one hand, a power supply unit 110. The power supply unit is arranged to deliver an electric current to the light source 10, and the intensity of the electric current is dependent on a reference voltage Vref. The power supply unit is for example formed by a linear converter circuit, known per se. Such circuits are within the scope of a person skilled in the art, and generally receive, as input, an input voltage Vin delivered by a source internal to the automotive vehicle. According to the embodiments of the invention, Vref may be different from Vin, since the voltage level is affected by the control unit 120.

The control unit 120 delivers, on the basis of the input voltage Vin, various reference voltage levels to the power supply unit 110, such that this unit is able to deliver electric currents of different intensities to the light source 10. The reference voltage level delivered by the control unit depends on an indication of the temperature of the light source, which is made available at the control unit 120. In order to be able to meet regulatory luminous-flux-intensity setpoints, the reference voltage levels are dependent on at least two temperature threshold values.

If the temperature of the light source lies below a first threshold value, a reference voltage that is lower than Vin is delivered to the power supply unit 120. This situation typically corresponds to that of starting up the automotive vehicle, or of turning on the headlight in question; the junction temperature of the light source is low, and the source does not yet need an electric current of high intensity to be able to emit a luminous flux having the required intensity.

If the temperature of the light source lies between a first threshold value and a second threshold value that is higher than the first threshold value, the situation corresponds to the source being in a steady state, and a higher voltage level is delivered to the power supply unit 120. This might be, by way of nonlimiting example, the voltage Vin, or a value that is independent of Vin.

In the event of light sources 10 operating for an extended period, it becomes essential to monitor the semiconductor elements for overheating, which may, in the worst case, result in their destruction. To this end, if the temperature of the light source lies above the second threshold value, a reference voltage that is lower than that in the steady state, potentially substantially equal to the voltage delivered when the source is cold, is delivered to the power supply unit.

Figure 2:
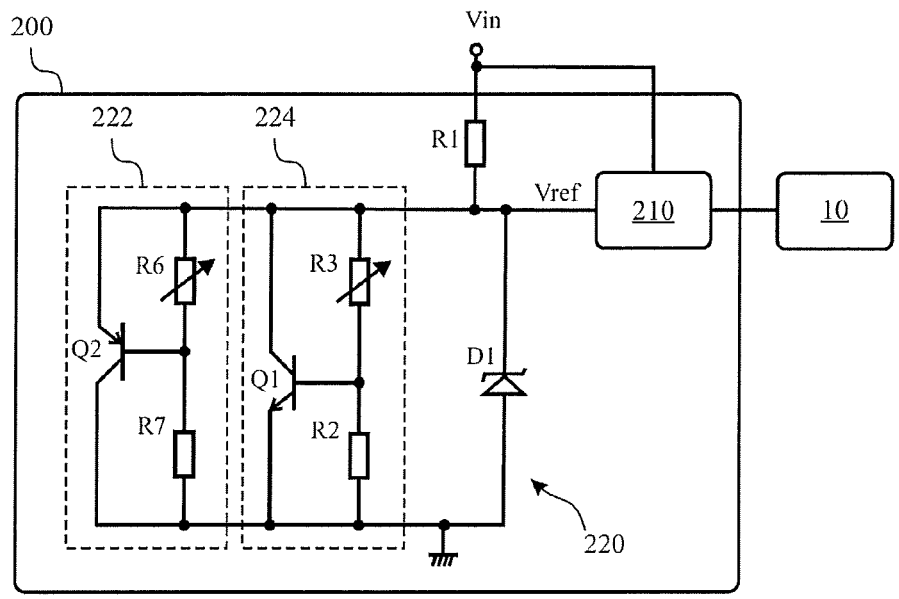
FIG. 2 shows a diagram corresponding to one preferred embodiment of a device according to the invention.

FIG. 2 shows another embodiment of the device 200 for driving the electrical power supply of light sources 10. The device 200 comprises, on the one hand, a power supply unit 210, in a manner similar to the preceding embodiment. Furthermore, the device 200 also comprises a control unit 220 for performing the operation that has been described for the preceding embodiment.

The control unit 220 delivers, on the basis of the input voltage Vin, various reference voltage levels to the power supply unit 210, such that this unit is able to deliver electric currents of different intensities to the light source 10. To this end, the control unit comprises an electronic assembly 220 comprising a plurality of branches 222, 224, one branch per temperature threshold. In the nonlimiting example illustrated by FIG. 2, there are two threshold values, hence the assembly comprises two distinct branches. An additional branch comprises a Zener diode D1.

The first branch 222 comprises a switch element that is formed for example by a PNP bipolar transistor. A thermistor R6 is connected between the emitter and the base, while a resistor R7 connects the base to ground. The thermistor in the example shown is an NTC element, the resistance of which decreases with increasing temperature. The first branch 222 is used to modify the voltage level Vref delivered to the power supply unit 210 when the temperature of the light source is low, i.e. below the first threshold value. In order for the thermistor R6 to provide a realistic indication of the temperature of the light source 210, it is advantageous for it to be placed in physical proximity to the source, for example on the same printed circuit board.

The second branch 224 comprises a switch element that is formed for example by a NPN bipolar transistor. A thermistor R3 is connected between the collector and the base, while a resistor R2 connects the base to ground. The thermistor in the example shown is an NTC element, the resistance of which decreases with increasing temperature. The second branch 224 is used to modify the voltage level Vref delivered to the power supply unit 210 when the temperature of the light source is high, i.e. above the second threshold value. In order for the thermistor R3 to provide a realistic indication of the temperature of the light source 210, it is advantageous for it to be placed in physical proximity to the source, for example on the same printed circuit board.

The components R3 and R6 are chosen and sized such that, if the source is already in a steady operating and temperature state, the respective switch elements Q1 and Q2 are in their off state. The steady state corresponds to a temperature of the source that lies between the first and the second threshold values. In this case, the electric current in the control unit 220 flows mainly through the Zener diode D1, which therefore determines the voltage level Vref delivered to the power supply unit 210.

As the temperature increases, the resistance of R3 decreases. Hence, more electric current flows through the resistor R2 until the transistor Q1 switches to the on state. The intensity of the current flowing through the Zener diode D1 is decreased, and the voltage level Vref decreases. The intensity of the electric current delivered to the source 10 is therefore decreased in order to protect it from harmful overheating. It is apparent that the temperature at which the resistance of the thermistor R3 is low enough for current to flow through R2 allows the second threshold value to be targeted. The negative voltage bias produced with respect to Vref is mainly determined by the resistor R2.

When the temperature decreases with respect to the steady state, the resistance of the thermistor R6 increases until the transistor Q2 switches to its on state. The resistance R7 is chosen so as to be sufficiently low to allow the passage of an electric current of sufficient intensity. The intensity of the current flowing through the Zener diode D1 is decreased with respect to the steady state, and the voltage level Vref decreases. The intensity of the electric current delivered to the source 10 is therefore decreased in order to prevent substantial variations in the level of the intensity of the emitted luminous flux.

This system makes it possible to prevent the luminous intensity emitted when cold, or at low ambient temperatures, from exceeding a maximum regulatory limit, while at the same time making it possible to observe the regulatory limits when the temperature of the light sources is high, while protecting them from overheating. It is apparent that the behaviour of the thermistor R6 determines the first threshold value.

It goes without saying that the same functionality may be achieved by means of other electronic assemblies, involving for example a PNP transistor instead of an NPN transistor, or a PTC thermistor instead of an NTC thermistor. Such modifications are within the scope of a person skilled in the art referring to the functional description and the concrete example given above. Similarly, the branches 222, 224 may involve additional electronic components that are not illustrated. For example, the resistors R2, R7 may be formed by resistive networks involving a plurality of distinct components without departing from the scope of the present invention. If a given application requires a power supply behaviour based on a plurality of temperature thresholds, additional branches may be provided in the control unit, without departing from the scope of the present invention.

Figure 3:
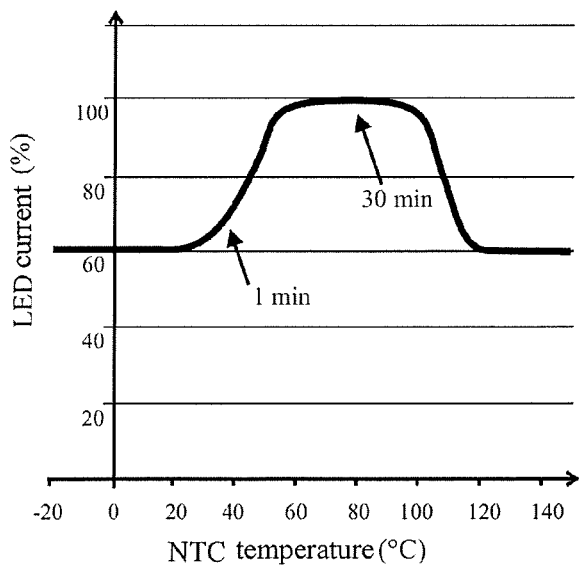
FIG. 3 shows the variation in the electric current flowing through a light source that is supplied with power using a device in accordance with one embodiment of the invention, according to an indication of the temperature of the light source.

FIG. 3 shows the behaviour of the intensity of the electric current that is delivered to the source 10, according to the temperature of the thermistors used in the two branches of the control unit. When cold, one minute after having turned the headlight on, the intensity of the current is decreased by around 30% with respect to its maximum intensity.

Figure 4:
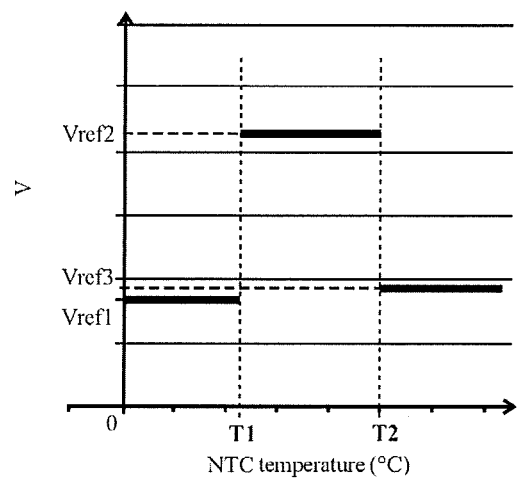
FIG. 4 shows the variation in the reference voltage level that is delivered by the control unit according to the indication of the temperature of the light source, in accordance with one preferred embodiment of the invention.

FIG. 4 shows the variation in the reference voltage delivered by the control unit to the power supply unit in one embodiment structured according to the preceding description. When the temperature of the light sources lies below a first threshold temperature value T1, a first reference voltage level Vref1 is delivered. When the temperature lies between the first threshold value T1 and a second, higher threshold value T2, a second reference voltage level Vref2 is delivered. Lastly, when the temperature lies beyond the second threshold value T2, the voltage level Vref3 is delivered. As illustrated, the values Vref1 and Vref3 are advantageously lower than the value Vref2, which makes it possible both to observe the regulations with respect to the maximum luminous flux at low temperature, and to protect the semiconductor junctions at high temperatures. The values Vref1 and Vref3 may ideally be different from one another, without that limiting the present invention.

Figure 5:
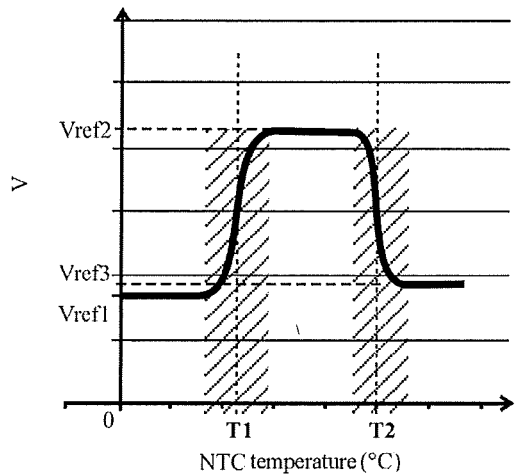
FIG. 5 shows the variation in the reference voltage level that is delivered by the control unit according to the indication of the temperature of the light source, in accordance with one preferred embodiment of the invention.

FIG. 5 shows the variation in the reference voltage delivered by the control unit to the power supply unit in another embodiment structured according to the preceding description. In general, the behaviour is similar to the behaviour illustrated by FIG. 4. However, the variations in the reference voltage level take place continuously and monotonically over a temperature range that is substantially centred around the threshold values T1 and T2, respectively, represented by hatched areas. These ranges of variation between the various delivered reference voltage levels are due to and dependent on the behaviour of the thermistors used in the assemblies described above. In general, the resistance of a thermistor varies continuously and monotonically over a range of temperatures, which explains the illustrated behaviour.

Figure 6:
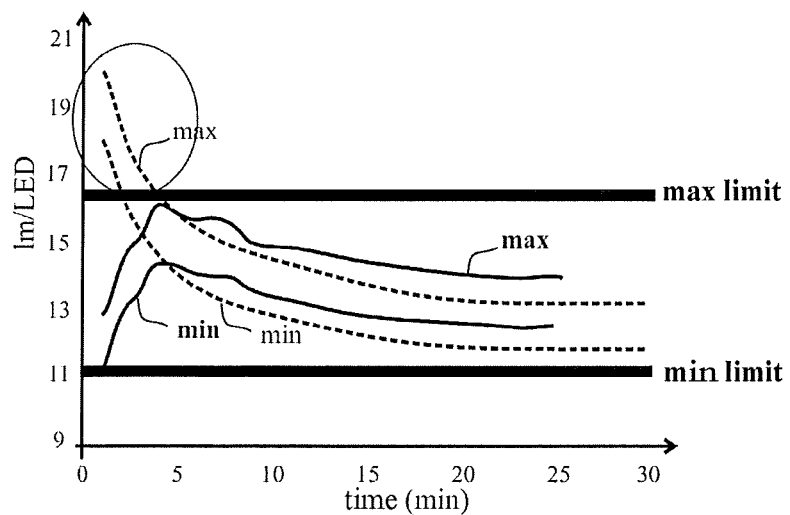
FIG. 6 shows the variation with operating time in the intensity of the luminous flux emitted by a light source that is supplied with power using a device in accordance with one embodiment of the invention, and the intensity in the luminous flux emitted by a light source that is supplied with power using a device known from the prior art.

FIG. 6 illustrates the difference in behaviour between a conventional driver device (dashed lines), sized to allow the emission of a luminous flux having a regulatory luminosity (between the min and max limits) after 30 minutes of operation, and a driver device according to the invention (solid lines), which makes it possible to manage the emission of the luminous flux dynamically with respect to the temperature. The temperature increases with time. It is apparent that the conventional system does not allow the maximum regulatory setpoints to be met when cold, since the luminosity is too high, while the system according to the invention automatically decreases the electric current supplying the light source with power over this temperature range.

The scope of protection is defined by the claims.

The invention claimed is:

1. A device for driving the electrical power supply of at least one light source of an automotive vehicle, the device including a power supply unit arranged to deliver an electric current to the light source, the intensity of the electric current being dependent on a reference voltage,
wherein the device comprises a control unit arranged to deliver, on the basis of an input voltage, various reference voltage levels to the power supply unit, according to an indication of the temperature of the light source with respect to at least a first temperature threshold value (T1) and a second temperature threshold value (T2), which is higher than the first temperature threshold value, wherein
the control unit comprises an assembly of at least two branches where each of the at least two branches comprises a switch element and a thermistor, where in one of the at least two branches, the thermistor is connected between an emitter and base of the switch element, and in another of the at least two branches, the thermistor is connected between a collector and the base of the switch element, the one of the at least two branches causes a first reference voltage delivered to the power supply unit when the temperature of the light source is low, and the another of the at least two branches causes a second reference voltage delivered to the power supply unit when the temperature of the light source is high.

2. The device according to claim 1, the control unit is arranged to deliver the first reference voltage level, if the indication of the temperature of the light source is lower than the first temperature threshold value, (T1), the second reference voltage level, higher than the first reference voltage level, if the indication of the temperature of the light source lies between the first temperature threshold value, (T1), and the second temperature threshold value, (T2), and a third reference voltage level, if the indication of the temperature of the light source is higher than the second temperature threshold value, (T2).

3. The device according to claim 2, wherein the control unit is arranged to increase/decrease the reference voltage level monotonically between the first, second and third reference voltage levels, according to the variation in the indication of the temperature of the light source over a range of values that is substantially centered around the first and second threshold values (T1) and (T2).

4. The device according to claim 2, wherein the thermistor is arranged such that an off state of the switch element depends on the temperature of the thermistor, and wherein the assembly is arranged to deliver the second reference voltage level if no electric current is flowing through each of the at least two branches.

5. The device according to claim 4, wherein the switch element comprises a bipolar transistor.

6. The device according to claim 4, wherein each branch comprises at least one resistor.

7. The device according to claim 4, wherein the features of electronic components of a branch define one of the threshold values, as well as a negative voltage bias with respect to the first reference voltage level.

8. The device according to claim 1, wherein the control unit is arranged such that the reference voltage level delivered to the power supply unit if the indication of the temperature is lower than the first threshold value is substantially equal to the reference voltage level delivered if the indication of the temperature is higher than the second threshold value.

9. The device according to claim 1, wherein the power supply unit comprises a linear converter circuit.

10. A lighting module for an automotive vehicle comprising at least one light source and a device for driving the electrical power supply of the light source, wherein the device is in accordance with claim 1.

11. The lighting module according to claim 10, wherein the light source comprises a light-emitting semiconductor element source.

12. The lighting module according to claim 10, wherein the light source comprises a pixelated light-emitting semiconductor element.

13. The device according to claim 3, wherein the thermistor is arranged such that an off state of the switch element depends on the temperature of the thermistor, and wherein the assembly is arranged to deliver the second reference voltage level if no electric current is flowing through each of the at least two branches.

14. The device according to claim 5, wherein each branch comprises at least one resistor.

15. The device according to claim 5, wherein the features of the electronic components of a branch define one of the threshold values, as well as a negative voltage bias with respect to the first reference voltage level.

16. The device according to claim 2, wherein the control unit is arranged such that the reference voltage level delivered to the power supply unit if the indication of the temperature is lower than the first threshold value is substantially equal to the reference voltage level delivered if the indication of the temperature is higher than the second threshold value.

17. The device according to claim 2, wherein the power supply unit comprises a linear converter circuit.

18. A lighting module for an automotive vehicle comprising at least one light source and a device for driving the electrical power supply of the light source, wherein the device is in accordance with claim 2.

19. The lighting module according to claim 11, wherein the light source comprises a pixelated light-emitting semiconductor element.

20. The device according to claim 5, wherein each branch comprises at least one resistor.

* * * * *